United States Patent
Pirk et al.

(10) Patent No.: US 12,134,199 B2
(45) Date of Patent: Nov. 5, 2024

(54) DETERMINING ENVIRONMENT-CONDITIONED ACTION SEQUENCES FOR ROBOTIC TASKS

(71) Applicant: GOOGLE LLC, Mountain View, CA (US)

(72) Inventors: Soeren Pirk, Palo Alto, CA (US); Seyed Mohammad Khansari Zadeh, San Carlos, CA (US); Karol Hausman, San Francisco, CA (US); Alexander Toshev, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 190 days.

(21) Appl. No.: 17/642,325

(22) PCT Filed: Sep. 9, 2020

(86) PCT No.: PCT/US2020/049851
§ 371 (c)(1),
(2) Date: Mar. 11, 2022

(87) PCT Pub. No.: WO2021/050488
PCT Pub. Date: Mar. 18, 2021

(65) Prior Publication Data
US 2022/0331962 A1 Oct. 20, 2022

Related U.S. Application Data

(60) Provisional application No. 62/900,603, filed on Sep. 15, 2019.

(51) Int. Cl.
*B25J 9/16* (2006.01)
*G06N 3/045* (2023.01)
(Continued)

(52) U.S. Cl.
CPC .......... *B25J 9/1697* (2013.01); *B25J 9/161* (2013.01); *B25J 9/163* (2013.01); *B25J 9/1664* (2013.01);
(Continued)

(58) Field of Classification Search
CPC . B25J 9/1697; B25J 9/161; B25J 9/163; B25J 9/1664; B25J 9/1669; B25J 9/1679;
(Continued)

(56) References Cited

U.S. PATENT DOCUMENTS

| 9,314,924 B1 | 4/2016 | Laurent |
| 2017/0355078 A1 | 12/2017 | Ur |

(Continued)

FOREIGN PATENT DOCUMENTS

| CN | 104049573 | 9/2014 |
| CN | 104908030 | 9/2015 |

(Continued)

OTHER PUBLICATIONS

European Patent Office; Communication pursuant to Article 94(3) issued in Application No. 20775548.9; 8 pages; dated Apr. 14, 2023.
(Continued)

*Primary Examiner* — Abby Y Lin
*Assistant Examiner* — Dylan M Katz
(74) *Attorney, Agent, or Firm* — Gray Ice Higdon

(57) ABSTRACT

Training and/or using a machine learning model for performing robotic tasks is disclosed herein. In many implementations, an environment-conditioned action sequence prediction model is used to determine a set of actions as well as a corresponding particular order for the actions for the robot to perform to complete the task. In many implementations, each action in the set of actions has a corresponding action network used to control the robot in performing the action.

14 Claims, 10 Drawing Sheets

(51) Int. Cl.
| | |
|---|---|
| G06V 10/147 | (2022.01) |
| G06V 10/44 | (2022.01) |
| G06V 10/82 | (2022.01) |
| G06V 20/10 | (2022.01) |
| G06V 20/17 | (2022.01) |
| G06V 20/13 | (2022.01) |

(52) U.S. Cl.
CPC ........... *B25J 9/1669* (2013.01); *B25J 9/1679* (2013.01); *G06N 3/045* (2023.01); *G06V 10/147* (2022.01); *G06V 10/454* (2022.01); *G06V 10/82* (2022.01); *G06V 20/10* (2022.01); *G06V 20/17* (2022.01); *G06V 20/13* (2022.01)

(58) Field of Classification Search
CPC ........ G06N 3/045; G06N 3/006; G06N 3/084; G06N 3/088; G06V 10/147; G06V 10/454; G06V 10/82; G06V 20/10; G06V 20/17; G06V 20/13; G06F 18/24143; G05B 2219/39271
See application file for complete search history.

(56) References Cited

U.S. PATENT DOCUMENTS

| | | | |
|---|---|---|---|
| 2018/0247160 A1 | 8/2018 | Rohani et al. | |
| 2018/0349725 A1 | 12/2018 | Konolige et al. | |
| 2019/0232488 A1 | 8/2019 | Levine et al. | |
| 2019/0258938 A1* | 8/2019 | Mnih | G06N 3/084 |
| 2020/0254609 A1* | 8/2020 | Claussen | B25J 9/1661 |
| 2020/0363815 A1* | 11/2020 | Mousavian | G06T 7/75 |
| 2021/0023715 A1* | 1/2021 | Zhang | B25J 9/1692 |
| 2022/0126844 A1* | 4/2022 | Di Stefano | G06V 10/82 |

FOREIGN PATENT DOCUMENTS

| | | |
|---|---|---|
| CN | 106960099 X | 7/2017 |
| CN | 110168574 | 8/2019 |

OTHER PUBLICATIONS

China National Intellectual Property Administration; Notification of First Office Action issued in Application No. 202080064771.0; 25 pages; dated Jun. 2, 2023.
Plaku, E. et al., "Sampling-Based Motion and Symbolic Action Planning with Geometric and Differential Constraints"; In International Conference on Robotics and Automation (ICRA); pp. 5002-5008; dated May 2010.
Ryoo, M.S. et al., "Semantic Understanding of Continued and Recursive Human Activities"; In International Conference on Pattern Recognition (ICPR); 4 pages; dated Aug. 2006.
Schaal, S. et al. "Learning Movement Primitives"; Springer Tracts in Advanced Robotics; 10 pages; dated 2004.
Sen, S. et al., "Automating Multi-Throw Multilateral Surgical Suturing with a Mechanical Needle Guide and Sequential Convex Optimization"; In International Conference on Robotics and Automation (ICRA); pp. 4178-4185; dated May 2016.
Sharma, A. et al., "Directed-Info GAIL: Learning Hierarchical Policies from Unsegmented Demonstrations Using Directed Information"; arXiv.org; arXiv:1810.01266v1; 14 pages; dated Sep. 2018.
Toussaint, M. et al., "Differentiable Physics and Stable Modes for Tool-Use and Manipulation Planning—Extended Abstract"; in proceedings of International Joint Conference on Artificial Intelligence; pp. 6231-6235; dated 2019.
Wang, H. et al., "Action Recognition by Dense Trajectories"; In Conference on Computer Vision and Pattern Recognition (CVPR); pp. 3169-3176; dated Jun. 2011.
Wang, H. et al., "Learning A Generative Model for Multi-Step Human-Object Interactions from Videos"; Computer Graphics Forum, vol. 38, Issue 2; 12 pages; dated May 2019.
Wu, T-Y, et al., "Liquid Pouring Monitoring Via Rich Sensory Inputs"; In European Conference on Computer Vision; 17 bages; dated 2018.
Xu, D. et al., "Neural Task Programming: Learning to Generalize Across Hierarchical Tasks"; in International Conference on Robotics and Automation (ICRA); pp. 3795-3802; dated May 2018.
Zhang, A. et al., "Composable Planning with Attributes"; in proceedings of the International Conference on Machine Learning; 10 pages; dated 2018.
Zhang, Z. et al., "Zero-Shot Learning Via Semantic Similarity Embedding"; in proceedings of the International Conference on Computer Vision (ICCV0; pp. 4166-4174; dated 2015.
Zhu, Y. et al., "Understanding Tools: Task-Oriented Object Modeling, Learning and Recognition"; in proceedings of the International Conference on Computer Vision and Pattern Recognition (CVPR); pp. 2855-2864; dated 2015.
Zhu, Z. et al., "Robot Learning from Demonstration in Robotic Assembly: A Survey"; Robotics, vol. 7, Issue 2; 25 pages; dated 2018.
European Patent Office; International Search Report and Written Opinion for PCT for Ser. No. PCT/US2020/049851; 11 pages; dated Nov. 23, 2020.
Bahdanau, D. et al., "Neural Machine Translation by Jointly Learning to Align and Translate"; in 3rd International Conference on Learning Representations; 15 pages; dated 2015.
Cho et al., "Learning phrase representations using mn encoder-decoder for statistical machine translation," arXiv, 15 pages; dated Sep. 3, 2014.
Finn, C. et al., "Deep Visual Foresight for Planning Robot Motion;" 2017 IEEE International Conference on Robotics and Automation (ICRA); pp. 2786-2793; dated May 29, 2017.
Hausman, K. et al., "Multi-Modal Imitation Learning from Unstructured Demonstrations using Generative Adversarial Nets;" In Neural Information Processing Systems (NIPS); 11 pages; dated 2017.
He, K. et al., "Deep Residual Learning for Image Recognition;" Proceedings of the IEEE Conference on Computer Vision and Patter Recognition (CVPR); pp. 770-778, dated 2016.
He, K. et al., "Mask R-CNN;" Proceedings of the IEEE Conference on Computer Vision (ICCV); pp. 2961-2969; dated 2017.
Kalashnikov, Dmitry, et al. "QT-Opt: Scalable Deep Reinforcement Learning for Vision-Based Robotic Manipulation." arXiv: 1806.10293v3 [cs.LG] Nov. 28, 2018; 23 pages; dated Nov. 28, 2018.
Karpathy et al., Large-scale Video Classification with Convolutional Neural Networks. In Compuer Vision and Pattern Recognition (CVPR), dated 2014.
Khansari-Zadeh, S. M., et al. (2011). "Learning Stable Nonlinear Dynamical Systems with Gaussian Mixture Models." IEEE Transactions on Robotics, 27(5), 943-957; dated 2011.
Mnih et al. "Human-Level Control Through Deep Reinforcement Learning." Nature 518, No. 7540; pp. 529-533; dated 2015.
Sutskever, I. et al.; Sequence to Sequence Learning with Neural Networks. In Advances in neural information processing systems (NIPS); pp. 1-9; dated 2014.
Zhu, Y. et al., "Target-driven Visual Navigation in Indoor Scenes using Deep Reinforcement Learning;" in IEEE International Conference on Robotics and Automation (ICRA); pp. 3357-3364; dated May 2017.
Ahsan, U. et al., "Video Jigsaw: Unsupervised Learning of Spatiotemporal Context for Video Action Recognition"; arXiv.org; arXiv:1808.07507; 11 pages; dated 2018.
Akbari, A. et al., Task Planning Using Physics-Based Heuristics on Manipulation Actions; In International Conference on Emerging Technologies and Factory Automation (ETFA); 8 pages; dated Sep. 2016.
Amiranashvili, A. et al. "Motion Perception in Reinforcement Learning with Dynamic Objects"; In Conference on Robot Learning (CoRL); 13 pages; dated 2018.
Bilen, H. et al., "Dynamic Image Networks for Action Recognition"; In proceedings of Conference on Computer Vision and Pattern Recognition (CVPR), pp. 3034-3042; dated 2016.

(56) References Cited

OTHER PUBLICATIONS

Brooks, R., "A Robust Layered Control System for a Mobile Robot"; IEEE Journal of Robotics and Automation; vol. RA-2, No. 1; pp. 14-23; dated Mar. 1986.

Cambon, S. et al., "A Hybrid Approach to Intricate Motion, Manipulation and Task Planning;" The International Journal of Robotics Research, SAGE Publications, 28(1), 42 pages; dated 2009.

Chopra, S. et al., "Learning A Similarity Metric Discriminatively, With Application to Face Verification"; In Computer Society Conference on Computer Vision and Pattern Recognition (CVPR); 8 pages; dated Jun. 2005.

Devin, C. et al., "Deep Object-Centric Representations for Generalizable Robot Learning"; In International Conference on Robotics and Automation (ICRA); pp. 7111-7118; dated May 2018.

Fazeli, N. et al., "See, Feel, Act: Hierarchical Learning for Complex Manipulation Skills with Multisensory Fusion"; Science Robotics, vol. 4, Issue 26; 10 pages; dated 2019.

Fikes, R.E. et al. "Learning and Executing Generalized Robot Plans"; Artificial Intelligence, vol. 3; pp. 251-288; dated 1972.

Fox, R. et al. "Multi-Level Discovery of Deep Options"; arXiv.org; arXiv:1703.08294v2; 19 pages; dated Oct. 5, 2017.

Garrett, C.R. et al., "FFRob: Leveraging Symbolic Planning for Efficient Task and Motion Planning"; International Journal of Robotics Research; vol. 37, Issue 1; 35 pages; dated 2018.

Hausman, K. et al., "Active Articulation Model Estimation Through Interactive Perception"; In International Conference on Robotics and Automation (ICRA); 8 pages; dated May 2015.

Hofer, S. et al., "Coupled Learning of Action Parameters and Forward Models for Manipulation"; In International Conference on Intelligent Robots and Systems (IROS); pp. 3893-3899; dated Oct. 2016.

Inoue, T. et al., "Deep Reinforcement Learning for High Precision Assembly Tasks;" In International Conference on Intelligent Robots and Systems (IROS), 7 pages, dated Sep. 2017.

Janner, M. et al., "Reasoning About Physical Interactions with Object-Oriented Prediction and Planning"; In International Conference on Learning Representations; 12 pages; dated May 2019.

Jones, J. et al., Toward Computer Vision Systems That Understand Real-World Assembly Processes; In Winter Conference on Applications of Computer Vision (WACV); pp. 426-434; dated Jan. 2019.

Kaelbling, L.P. et al., "Hierarchical Task and Motion Planning in the Now"; In International Conference on Robotics and Automation (ICRA); pp. 1470-1477; dated May 2011.

Kipf, T. et al., "CompILE: Compositional Imitation Learning and Execution"; In International Conference on Machine Learning (ICML); 11 pages; dated 2019.

Krishnan, S. et al., DDCO: Discovery of Deep Continuous Options for Robot Learning from Demonstrations; In Conference on Robot Learning (CoRL); 20 pages; dated 2017.

Kroemer, O. et al., "Towards Learning Hierarchical Skills for Multiphase Manipulation Tasks"; In International Conference on Robotics and Automation (ICRA); 8 pages; dated May 2015.

Lagriffoul, F. et al., "Efficiently combining task and motion planning using geometric constraints"; International Journal of Robotics Research, vol. 33, Issue 14; pp. 1726-1747; dated 2014.

Lakshminarayanan, A. et al., "Option Discovery in Hierarchical Reinforcement Learning using Spatio-Temporal Clustering"; arXiv. org; arXiv:1605.05359v2; 7 pages; dated 2016.

Lea, C. et al., "Temporal Convolutional Networks: A Unified Approach to Action Segmentation"; In European Conference on Computer Vision (ECCV) Workshops; pp. 47-54; dated 2016.

Liu, J. et al., "Recognizing Human Actions by Attributes"; In Conference on Computer Vision and Pattern Recognition (CVPR); pp. 3337-3344; dated 2011.

Lozano-Perez, T. et al., "Handey: A Robot System That Recognizes, Plans, and Manipulates"; In International Conference Robotics and Automation (ICRA); pp. 843-849; dated 1987.

Luo, Z. et al., "3D Backscatter Localization for Fine-Grained Robotics"; In 16th Usenix Symposium on Networked Systems Design and Implementation (NSDI'19); pp. 765-781; dated 2019.

Moore, D. et al., "Recognizing Multitasked Activities from Video Using Stochastic Context-Free Grammar"; In Association for the Advancement of Artificial Intelligence (AAAI) Conference; pp. 770-776; dated 2002.

Muxfeldt, A. et al., "Hierarchical Decomposition of Industrial Assembly Tasks"; In Conference on Emerging Technologies and Factory Automation (ETFA); 8 pages; dated Sep. 2016.

Ng, J. et al. "Beyond Short Snippets: Deep Networks for Video Classification"; In IEEE Conference on Computer Vision and Pattern Recognition (CVPR); pp. 4694-4702; dated 2015.

Niekum, S. et a; "Learning and Generalization of Complex Tasks from Unstructured Demonstrations"; In International Conference on Intelligent Robots and Systems (IROS); 8 pages; dated Oct. 2012.

Niekum, S. et al., "Incremental Semantically Grounded Learning from Demonstration"; In Robotics: Science and Systems; 8 pages; dated 2013.

Niekum, S. et al., "Learning Grounded Finite State Representations from Unstructured Demonstrations"; International Journal of Robotics Research, vol. 34; 45 pages; dated 2014.

Openal, "Learning Dexterous In-Hand Manipulation"; arXiv.org, arXiv: 1808.00177v2; 27 pages; dated Aug. 2018.

Orthey, A. et al., "Optimizing Motion Primitives to Make Symbolic Models More Predictive"; In International Conference on Robotics and Automation (ICRA); 6 pages, dated May 2013.

Piergiovanni, A.J., et al., "Learning Latent Subevents in Activity Videos Using Temporal Attention"; In proceedings of 31st AAAI Conference on Artificial Intelligence; pp. 4247-4254, dated 2017.

Pirsiavash, H. et al., "Parsing Videos of Actions with Segmental Grammars"; In proceedings of the IEEE Conference on Computer Vision and Pattern Recognition (CVPR); pp. 612-619; dated 2014.

China National Intellectual Property Administration; Notification of Second Office Action issued in Application No. 202080064771.0; 15 pages; dated Jan. 31, 2024.

European Patent Office, Intention to Grant issued in Application No. 20775548.9; 47 pages; dated Jun. 5, 2024.

China National Intellectual Property Administration; Notice of Allowance issued in Application No. 202080064771.0; 6 pages; dated Jun. 12, 2024.

\* cited by examiner

DETERMINING ENVIRONMENT-CONDITIONED ACTION SEQUENCES FOR ROBOTIC TASKS

BACKGROUND

Many robots are programmed to perform certain tasks such as a robot on an assembly line can be programmed to recognize certain objects, and perform particular manipulations to those certain objects. For example, a robot may utilize a grasping end effector such as an "impactive" gripper or an "ingressive" gripper (e.g., physically penetrating an object using pins, needles, etc.) to pick up an object from a first location, move the object to a second location, and drop off the object at the second location. Some additional examples of robot end effectors that may grasp objects include "astrictive" end effectors (e.g., using suction or vacuum to pick up an object) and one or more "contigutive" end effectors (e.g., using surface tension, freezing or adhesive to pick up an object), to name just a few.

SUMMARY

Implementations disclosed herein utilize a trained action sequence prediction model in determining a predicted sequence of actions for a robotic task based on an instance of vision data captured by a robot. In many implementations, the sequence of predicted actions can be conditioned on the environment of the robot where the robot can encounter object(s) in the environment in different initial positions when completing the task. For example, a robot can encounter an open door when completing a task for the first time, and can encounter a closed door when completing the same task for a second time.

Performing a robotic task requires a robot to respond to changes in the environment. As an illustrative example, an object manipulation task can include the goal of having a cup containing a ball inside a closed cabinet. When performing the task, the robot can encounter different environment states such as different locations of the cup, different locations of the ball, and/or different states of the cabinet door (i.e., the cabinet door being open or the cabinet door being closed). Potential actions required to complete the task can include: opening the cabinet door, closing the cabinet door, moving the cup, moving the ball, moving the ball into the cup, and moving the ball with the cup.

When performing the task for a first time, the robot can encounter a closed cabinet with the ball and the cup sitting outside of the cabinet. In many implementations, the action sequence prediction model can be used in determining a predicted sequence of actions of (1) moving the ball into the cup, (2) opening a cabinet door, (3) moving the ball with the cup into the cabinet, and (4) closing the cabinet door. In the illustrated example, some combinations of actions have an inherent sequential order, such as opening the cabinet door before moving the ball with the cup into the cabinet, moving the ball with the cup into the cabinet before closing the cabinet door, etc. Additionally or alternatively, some combinations of actions can be performed in any order. For example, there is no inherent order between placing the ball into the cup and opening the cabinet door. In other words, the robot can complete the task by placing the ball into the cup before or after opening the cabinet door.

As a further example, when performing the task for a second time, the robot can encounter the ball inside a closed cabinet. The action sequence prediction model be used in determining a predicted sequence of actions of (1) opening the cabinet door, (2) moving the cup, (3) moving the ball, (4) moving the ball to the cup, (5), moving the ball with the cup into the cabinet, and (5) closing the cabinet door. As described above, some sequence(s) of actions have an inherent order while other sequence(s) of actions do not have an inherent order. For example, the cabinet door should be opened before the cup and the ball can be moved. Similarly, the ball with the cup should be moved into the cabinet before the cabinet door should be closed. However, there is no inherent order in moving the cup and moving the ball outside of the cabinet and these actions can be performed in either order to complete the task.

The environment-conditioned action sequence prediction model can include a convolutional neural network model ("CNN") portion as well as a sequence-to-sequence model portion. In a variety of implementations, an instance of vision data captured using sensor(s) of the robot, such as an image captured using a camera of the robot, can be processed using the CNN portion to determine an embedding corresponding to the instance of vision data. The embedding can be processed using the sequence-to-sequence model portion (such as an encoder-decoder model, a transformer model, etc.) to determine the predicted sequence of actions to complete the robotic task.

The predicted sequence of actions can change depending on the instance of vision data captured by the robot. For example, as described above, a robot can encounter a closed cabinet with the ball and the cup sitting outside of the cabinet. The action sequence prediction model can be used to determine a predicted sequence of actions of: (1) moving the ball into the cup, (2) opening a cabinet door, (3) moving the ball with the cup into the cabinet, and (4) closing the cabinet door. Additionally or alternatively, the robot can encounter the cup and the ball inside a closed cabinet, where the action sequence prediction model can be used in determining a predicted sequence of actions of (1) opening the cabinet door, (2) moving the cup, (3) moving the ball, (4) moving the ball to the cup, (5), moving the ball with the cup into the cabinet, and (5) closing the cabinet door. In many implementations, the sequence of actions determined using the action sequence prediction model can contain different actions depending on actions necessary to complete the robotic task. For example, when the robot encounters a closed cabinet with the ball and the cup sitting outside of the cabinet, the corresponding predicted sequence of actions does not include moving the ball outside of the cabinet and/or moving the cup outside of the cabinet because the actions are unneeded. Similarly, when the robot encounters the cup and the ball inside a closed cabinet, the corresponding predicted sequence of actions will include the actions of moving the ball and moving the cup.

Each action in the predicted sequence can be used to determine a corresponding action network, where output generated by processing additional robotic sensor data using the corresponding action network can be used in controlling the robot. In many implementations, the action network corresponding to each action can be a distinct network, such as a distinct policy network. In some such implementations, each policy network can be trained using reinforcement learning based on kinesthetic demonstrations such as demonstrations performed by teleoperation of the robot.

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
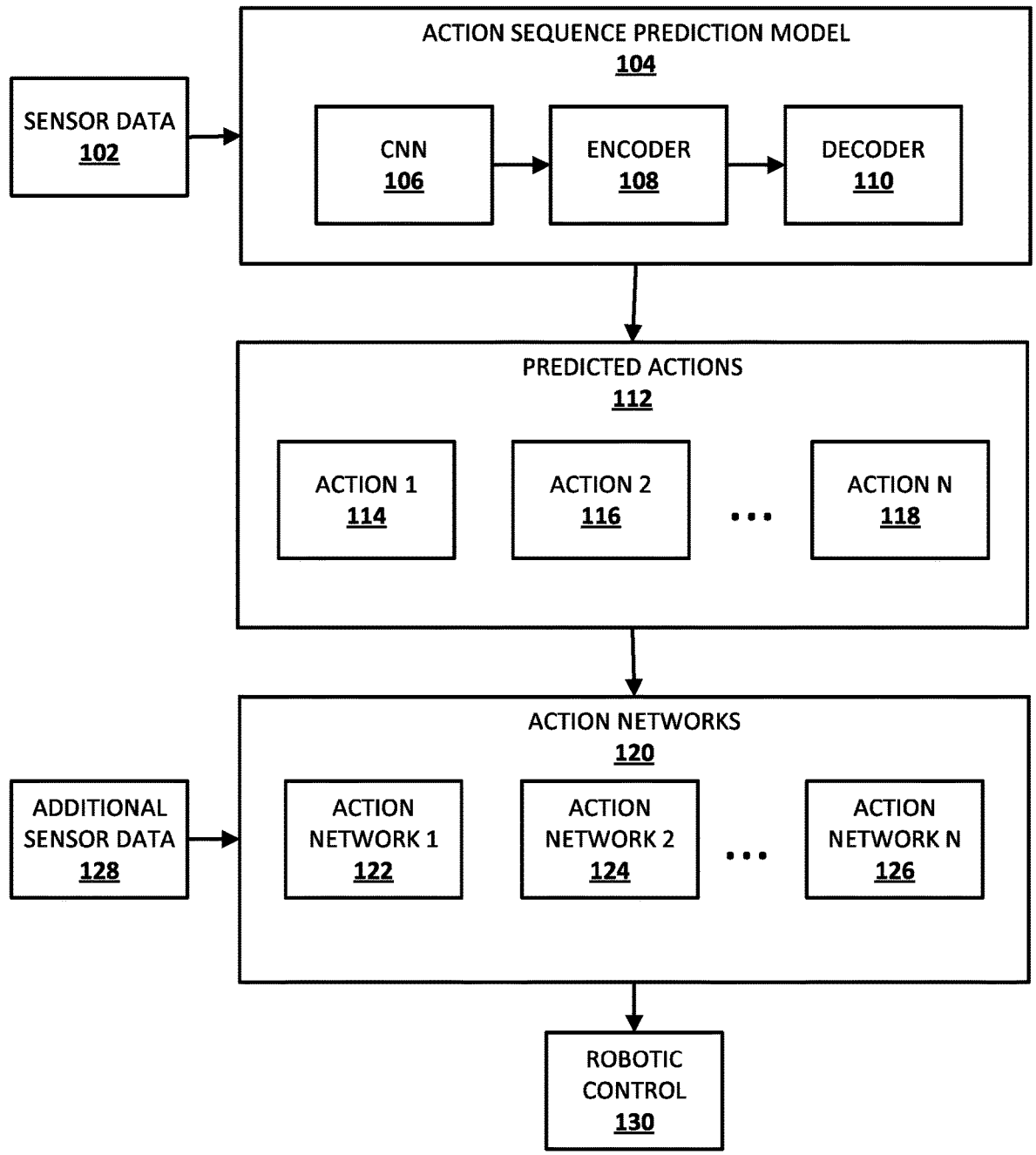
FIG. 1 illustrates an example of generating a set of predicted actions using an environment-conditioned action sequence prediction model, and using the set of predicted actions to control a robot in accordance with implementations disclosed herein.

Complex object manipulation tasks may span over long sequences of operations. Task planning over long-time horizons can be challenging, and its complexity can grow exponentially with an increasing number of subtasks. Implementations disclosed herein are directed towards a deep learning network that learns dependencies and transitions across subtasks solely from a set of demonstration videos. Each subtask can be represented as an action symbol (e.g. move cup), and these symbols can be learned and predicted directly from image observations. Learning from demonstrations may make the learning tractable as it provides the network with information about the most frequent transitions and relevant dependency between subtasks (instead of exploring all possible combination), while learning from visual observations may cause the network to continuously monitor the task progress and thus to interactively adapt to changes in the environment. Some implementations may be evaluated using two long horizon tasks: (1) block stacking of puzzle pieces being executed by humans, and (2) a robot manipulation task involving pick and place of objects and sliding a cabinet door on a 7-DoF robot arm. For some implementations, it can be shown that complex plans can be carried out when executing the robotic task and the robot can interactively adapt to changes in the environment and recover from failure cases.

Some implementations described herein may utilize a two layer representation of complex tasks, where a set of abstract actions or sub-tasks can be used as an intermediate representation of a set of abstract actions or sub-tasks. Each action can be represented by a symbol that describes what needs to happen to complete a sub-task in an abstract manner (e.g. move cup). This discretization allows us to reason about the structure of tasks without being faced with the intricacies of real environments and the related physics (e.g. object pose).

Each symbol can be used to select an individual policy that describes how an object or the agent itself needs to be manipulated toward the higher-level goal. In some implementations, when executing an action, the complexity imposed by the real scene, such as finding an object or identifying its pose to grasp it, can be considered. The goal is to execute complex and long-horizon tasks by learning the sequential dependencies between task-relevant actions. To learn sequences of sub-tasks while respecting changes in the scene, some implementations employ a sequence-to-sequence model, commonly used for natural language processing, to translate sequences of image embeddings to action symbols.

The capabilities of sequence prediction may be tested by evaluating some implementations on two environments. First, a robot arm can be used to manipulate objects in an office environment, where the goal is to find objects in a cabinet, perform operations on the objects, and to move them back into the cabinet. For example, the task can be to find a cup, to put a ball in the cup, and to move both objects together back to the cabinet. Different sequences of sub-tasks can lead to a successful completion of the task. For example, while the robot has to first open the cabinet door, it can then either move the cup or the ball outside the cabinet, to eventually put the ball in the cup and both objects back into the cabinet. Second, a robot can perform a stacking task that requires to move blocks from an initially random configuration to three stacks of blocks.

Unlike existing work that mostly focuses on learning action symbols implicitly—e.g. as latent variables—implementations described herein can represent actions explicitly, which in turn may provide more semantics of a task. Additionally or alternatively, the action symbols can be learned directly from sequences of images. This may facilitate inferring the correct order of actions necessary to complete a task, while also allowing a response to changes in the environment. Each individual action is then executed with an individual policy.

In some implementations, the sequential structure of tasks can be learned by factorizing them into task-relevant actions. This is motivated by the observation that many tasks are as well combinatorial as they are continuous. They are combinatorial in that an agent has to select among a discrete set of objects to perform a task. For example, a stacking task requires to arrange a number of objects. However, an agent has to also operate in a physical environment that requires interacting with objects in continuous ways.

Optimizing for both of the aforementioned factors to perform long-term planning may be challenging due to the uncertainty imposed by the actual scene. Therefore, to perform long-term planning, long-horizon tasks can be factorized into a discrete set of actions. These actions represent what needs to happen to complete a sub-task, but at a very high-level of abstraction and without any notion of how an agent has to perform the action. For example, an action might just be 'move cup'. Second, once a task is structured into task-relevant actions expert policies can be obtained from learned demonstrations to perform individual actions.

A set of action symbols can be utilized as an abstract representation of sub-tasks. These symbols represent basic actions, such as 'open door', 'move cup', 'put ball', etc. In some implementations, the set of action symbols may be manually defined for different tasks. Additionally or alternatively, the set of action symbols may be automatically defined for different tasks (e.g., a trained machine learning model can be utilized to generate the set of action symbols). Sequences of symbols can provide an abstraction of the task that can be learned to be predicted and then executed on a robot. The set of symbols is denoted as K.

Action symbols can be used in two ways: first, a single frame action classifier can be trained, that allows the generation of embeddings of images. Second, an encoder-decoder sequence-to-sequence model can be trained to translate sequences of image embeddings to sequences of action symbols. Together, both models can be used to predict the next action based on the current state of the scene as well as according to which sub-tasks were already completed.

In some implementations, to obtain a representation of the scene as well as of ongoing actions, a convolutional neural network can be trained as an action recognition model. For example, the CNN can include a ResNet50 backbone with one extra dense layer (32 dimensions) to extract image features and another dense layer followed by a Softmax to fine tune the network on action symbols as labels. This model may be trained as a single image action predictor on images of sequences, where each image is labeled with an action symbol. Action recognition based on a single frame may be a challenging problem, as an action shown in a single image can be ambiguous; e.g. reaching toward a cup looks the same as moving away from it. However, our goal is not to use the resulting classification of this model, but instead to use the resulting embedding as input to our sequence-to-sequence model. The sequence-to-sequence model can then translate the produced embeddings to action symbols. Furthermore, as the sequence-to-sequence model maintains an internal state it can resolve ambiguities introduced by wrongly predicted action symbols of the action classifier.

In some implementations, sequence models can be used to predict future action symbols given a history of image embeddings. Given a sequence of image embeddings ($E_1, \ldots, E_T$) up to current time t, the next k action symbols can be predicted ($a_{t+1}, \ldots, a_{t+k}$):

$$a_{t+1}, \ldots, a_{t+k} = \text{SeqMod}(E_1, \ldots, E_t)$$

In some implementations, the above formulation may be cast as a 'translation' of image embeddings to action symbol sequence. Therefore, a sequence-to-sequence model (i.e., a neural translation formulation) may be utilized where the embedding sequence may be mapped to an action sequence. In some implementations, the sequence-to-sequence model may consist of an encoder and decoder LSTM. The encoder can consume the input image as a sequence of embeddings and can encode it into a single vector, which may be subsequently decoded into an action symbol sequence by a second LSTM.

In some implementations, learning the sequential structure of tasks based on image embeddings and action symbols may facilitate the performance of tasks in varying combinations of sub-tasks and depending on a given scene configuration. For example, the stacking task shown requires stacking colored blocks in a specific configuration. Two blocks (red, yellow) need to be in place before other blocks (pink, green) can be stacked on top of them. Given this task description, the task can be performed in different orders. For example, the blue block can be put up independently of the other blocks, while the green and pink blocks depend on the red and yellow blocks.

In some implementations, action symbols can be modeled as motion primitives. A motion primitive is a parameterized policy to perform an atomic action, such as grasping, placing, etc. Primitives can be used as building blocks that can be composed, for example by a state machine, to enable more advanced robot behavior. For example, the task of putting an object into a cabinet may have motion primitives of: grasping, opening/closing cabinet, and placing. The state machine may be used for sequencing the primitives based on the world state. Initially it may trigger the cabinet opening primitive. Upon its success, it may switch to the grasping primitive and may condition it on the particular object that needs to be grasped. Then it may proceed with the placing primitive, followed by the closing cabinet primitive. In case of a failure, the state machine may switch the primitive to recover from the error. Note that the use of state-machine may implicitly require access to a success detection module in order to properly transit from one primitive to another.

In some implementations, the state machine may be used together with motion primitives. The symbol prediction network may replace the state machine and success detection module. Each of the action symbols may correspond to a motion primitive, hence we have separate primitives to grasp a cup, grasp a ball, move a cup, move a ball, slide the door, and so on. Note that without loss of generality, some implementations may utilize different grasping/moving primitives for each object to simplify the run-time execution. Alternatively, in some other implementations, all grasping primitives could be unified to one grasping policy for multiple objects, e.g. cup and ball.

In some implementations, each of the motion primitive can be modeled as a dynamical systems policy (DSP), which can be trained from a few demonstrations. Given a target pose, i.e. the object pose, DSP drives the robot arm from its initial pose to the target pose while exhibiting a similar behavior as the demonstrations. In some implementations, each of the primitives can be trained based on five demonstrations captured through Kinesthetic demonstrations. The input to each DSP primitive may be the current object and arm end-effector pose, and the output may be the next end-effector pose. In some implementations, the robot is equipped with a perception system that performs object detection and classification and can provide the Cartesian pose of each object with respect to the robot frame, which may be passed to DSP primitives. DSP representation may allow for quickly modeling each primitive with a couple of demonstrations, however, at this may be at the cost of depending on a perception system. Additional and/or alternative method(s) can be used in place of DSP such as using an end-to-end deep network policy to represent each primitive to avoid this dependency.

In some implementations, once the sequential model determines the next action, the corresponding primitive may be called with the poses of relevant objects and the robot may start executing the motion. Note that in some implementations there are two loops: 1) the DSP control loop which, for example, runs at 20 Hz and is in charge of moving the arm to the target location, and 2) the symbolic switching loop which, for example, runs at 2 Hz and determines the next primitive that needs to be executed solely based on the stream of images.

In some implementations, the action classifier may be trained on single pairs of images and action symbols and these pairs can be randomly (or pseudo randomly) selected from all sequences of the training data. Furthermore, the action classification model may be trained separately for each dataset until it converges. In some implementations, the action classification model converges within 200 epochs.

In some implementations, the sequence-to-sequence network may be trained on sequences of image embeddings and action symbols. Instead of training on the full sequences, the network can be trained on sub-sequences of a specified sequence length (SL). For example, the sequence to sequence network may be trained using a sub-sequence of lengths 10, 20, 30, and/or additional or alternative lengths. The sub-sequences can be generated as 'sliding windows' over an entire sequence. In some implementations, the sequence to sequence model can be trained so as to translate sequences of image embeddings to predict a sequence of action symbols. However, the sequence of predicted action symbols may be offset by k, where k represents the number of steps we want to predict in the future. For example, the number of steps can be set to k=1, which means that an action one step ahead in the future can be predicted. In some implementations, the number of steps can be set to k=N number of steps which means that an action N steps ahead in the future can be predicted (e.g., k=1 where an action one step ahead in the future can be predicted; k=2 where an action two steps ahead in the future can be predicted; k=3 where an action three steps ahead in the future can be predicted, etc.).

In some implementations, the encoder may take the input frame embeddings and may generate a state embedding vector from its last recurrent layer, which encodes the information of all input elements. The decoder can then take this state embedding and convert it back to action symbol sequences. In some implementations, both networks can be trained individually for each task. The sequence-to-sequence model can be trained with a latent dimension of 256 and usually converges after 50 epochs. In some implementations, the hyperparameters of either model may not be specifically fine-tuned. Additionally or alternatively, in some implementations, both networks can be trained simultaneously for each task.

Turning to the figures, FIG. 1 illustrates an example of generating a set of predicted actions using an environment-conditioned action sequence prediction model, and using the set of predicted actions in controlling a robot. In the illustrated example, an instance of sensor data 102 can be processed using an environment-conditioned action sequence prediction model 104 to generate a set of predicted actions 112 and a corresponding order to perform the actions in the set. The instance of sensor data 102 can be captured using one or more sensors of a robot. For example, the instance of sensor data 102 can be captured using a variety of sensor(s) of the robot such as vision sensor(s), light sensor(s), pressure sensor(s), pressure wave sensor(s) (e.g., microphones), proximity sensor(s), accelerometer(s), gyroscope(s), thermometer(s), barometer(s), and so forth. In a variety of implementations, the instance of sensor data 102 can include an instance of vision data captured using a camera of the robot. Environment-conditioned action sequence prediction model 104 can include a convolutional neural network model portion 106, an encoder portion 108, a decoder portion 110, and/or additional or alternative machine learning model portion(s) (not depicted). In many implementations, sensor data 102 can be processed using convolutional neural network model portion 106 to generate an embedding corresponding to the instance of sensor data. Additionally or alternatively, encoder 108 and decoder 110 can be used in processing the embedding to generate the set of predicted actions 112.

The set of predicted actions 112 can include action 1 114, action 2 116, ..., action N 118. In many implementations, the set of actions has a corresponding particular order such as performing action 1 114, performing action 2 116, ..., performing action N 118. Each predicted action can have a corresponding action network in the action networks 120. For example, action network 1 122 can correspond to action 1 114, action network 2 124 can correspond to action 2 124, ..., action network N 126 can correspond to action N 118. In a variety of implementations, a selected action network can be used in processing one or more instances of additional sensor data 128 for use in robotic control 130 to cause the robot to perform action 1. Once action 1 is complete, action network 2 124 can be used in processing one or more additional instances of additional sensor data 128 for use in robotic control 130 to cause the robot to perform action 2. Additionally or alternatively, once action N−1 is complete, action network N 126 can be used in processing one or more additional instances of additional sensor data 128 for use in robotic control 130 to cause the robot to perform action N.

Figure 2A:
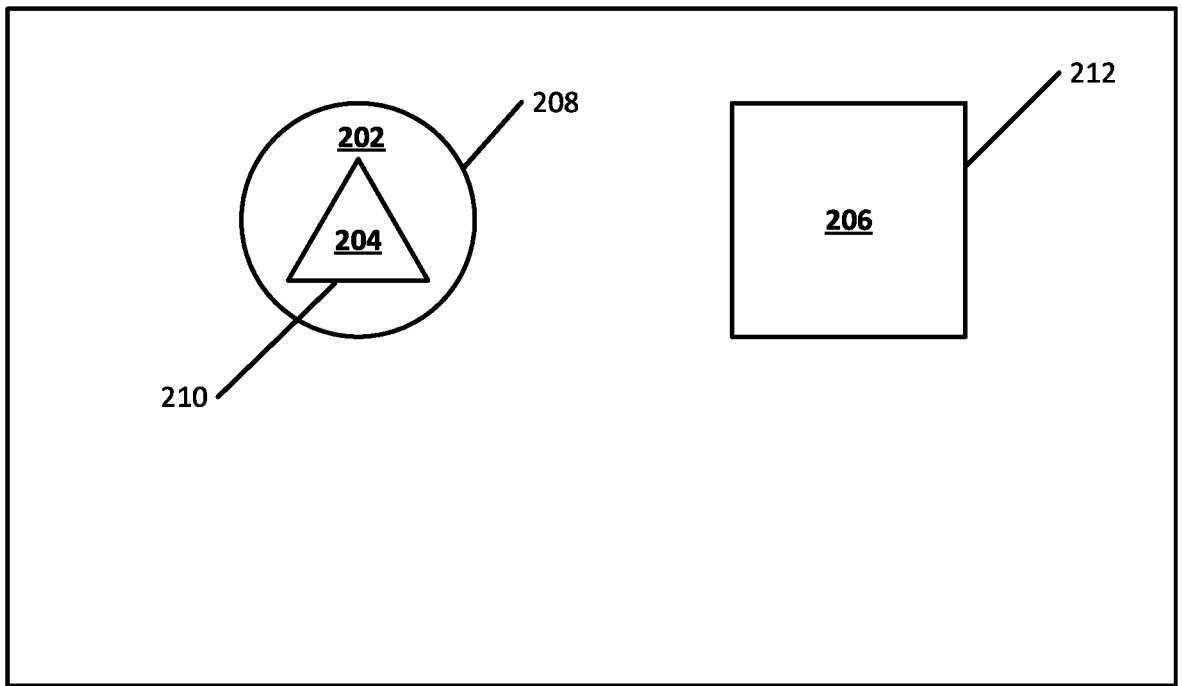
FIG. 2A illustrates an example object manipulation robotic task in accordance with implementations disclosed herein.

FIG. 2A illustrates an example object manipulation robotic task. Example 200 illustrates an object manipulation task with a goal of positioning blocks in desired locations. Block 202 is a circle placed in desired position 208. Block 204 is a triangle placed in desired position 210 stacked on top of block 202. Block 206 is a square placed in desired position 212. The placement of blocks 202 and 204 have an inherent sequential order, where block 202 must be placed in position 208 prior to the placement of block 204 in position 210 on top of block 202. Additionally or alternatively, the placement of block 206 does not have an inherent sequential order as block 206 can be placed before block 202, between the placement of block 202 and block 204, and/or after the placement of block 204. In other words, a variety of sequences of actions can be utilized for block placement in the illustrated example including: (1) place block 206, place block 202, place block 204; (2) place block 202, place block 206, place block 204, and (3) place block 202, place block 204, place block 206.

Figure 2B:
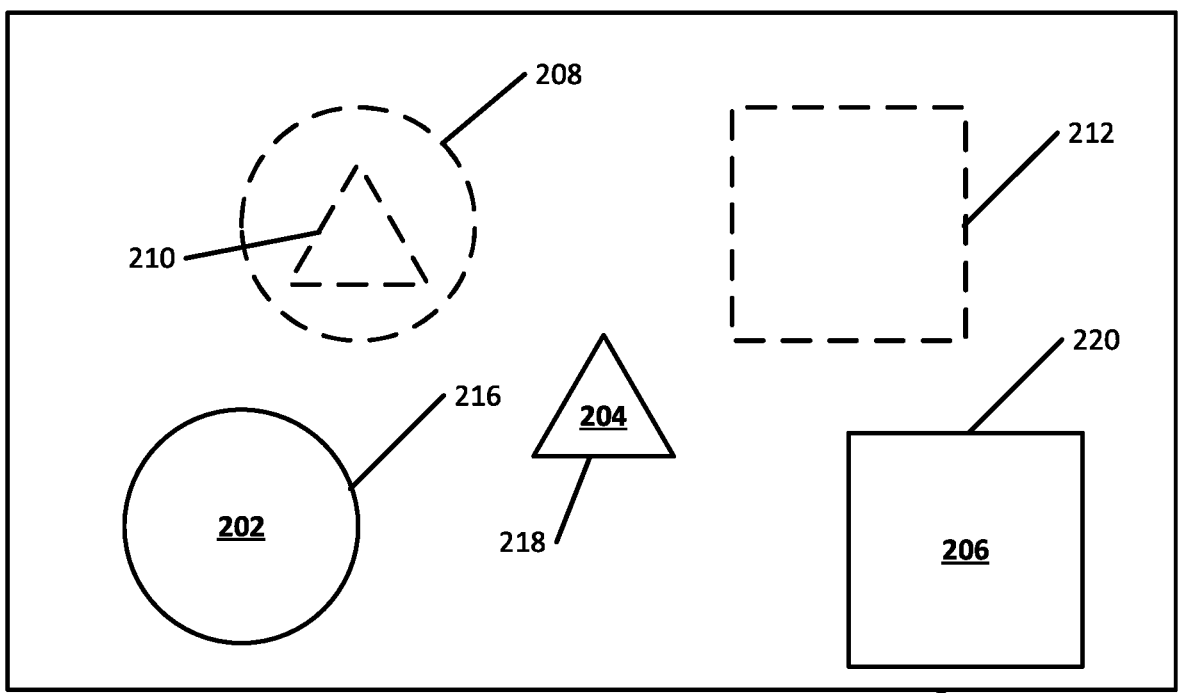
FIG. 2B illustrates an example instance of sensor data for the object manipulation robotic task of FIG. 2A in accordance with implementations disclosed herein.

FIG. 2B illustrates an instance of vision data 214 capturing the initial poses of objects 202, 204, and 206. Object 202 is initially at position 216, object 204 is initially at position 218, and object 206 is initially at position 220. An environment-conditioned action sequence prediction model in accordance with many implementations can be utilized to determine a set of predicted actions as well as a corresponding order to place object 202 at position 208, object 204 at position 210, and object 206 at position 212. For example, the environment-conditioned action sequence prediction model can determine the set of predicted actions with a corresponding particular order of (1) place block 206, place block 202, place block 204; (2) place block 202, place block 206, place block 204, and/or (3) place block 202, place block 204, place block 206. In the illustrated example, the desired goal positions 208, 210, and 212 are depicted by dash lines.

Figure 2C:
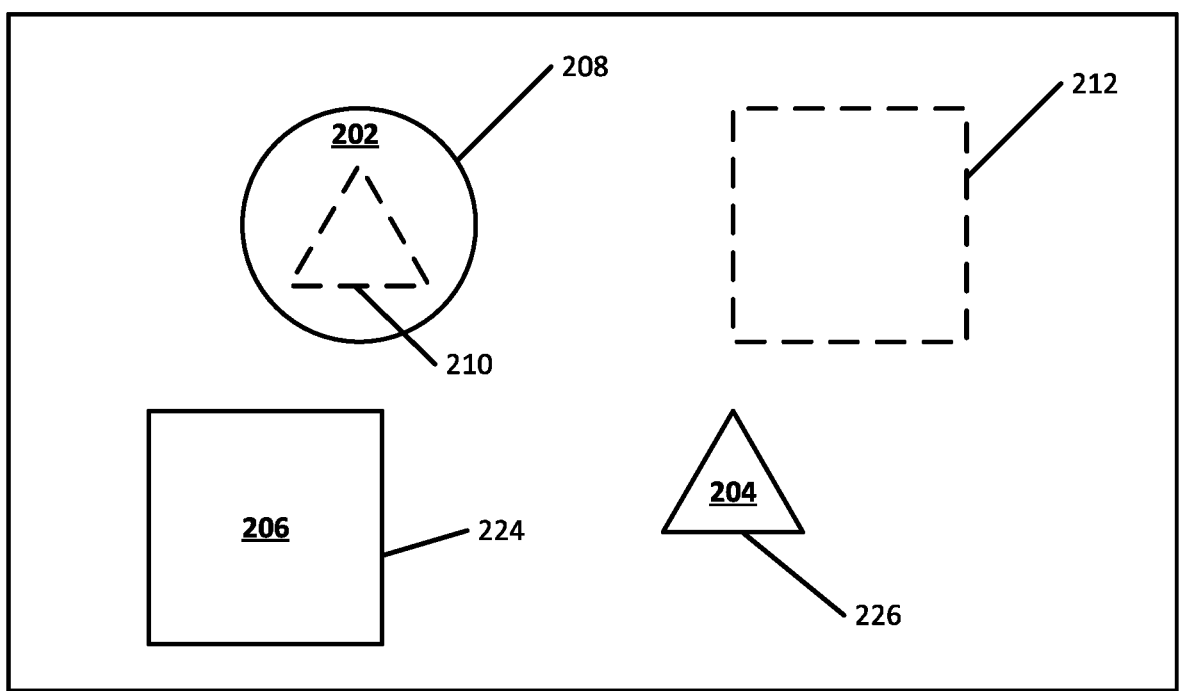
FIG. 2C illustrates another instance of sensor data for the object manipulation robotic task of FIG. 2A in accordance with implementations disclosed herein.

FIG. 2C illustrates another instance of vision data 222 capturing the additional initial poses of objects 202, 204, and 206. Object 202 is initially in position 208, object 204 is initially in position 226, and object 206 is initially in position 224. The initial positioning of object 202 is such that it is already positioned in the desired goal position 208. In other words, the robot does not need to move object 202 to complete the task. The environment-conditioned action sequence prediction model can be utilized to determine the set of predicted actions with a corresponding particular order of (1) place block 204, place block 206; and/or (2) place block 206, place block 204.

Figure 3:
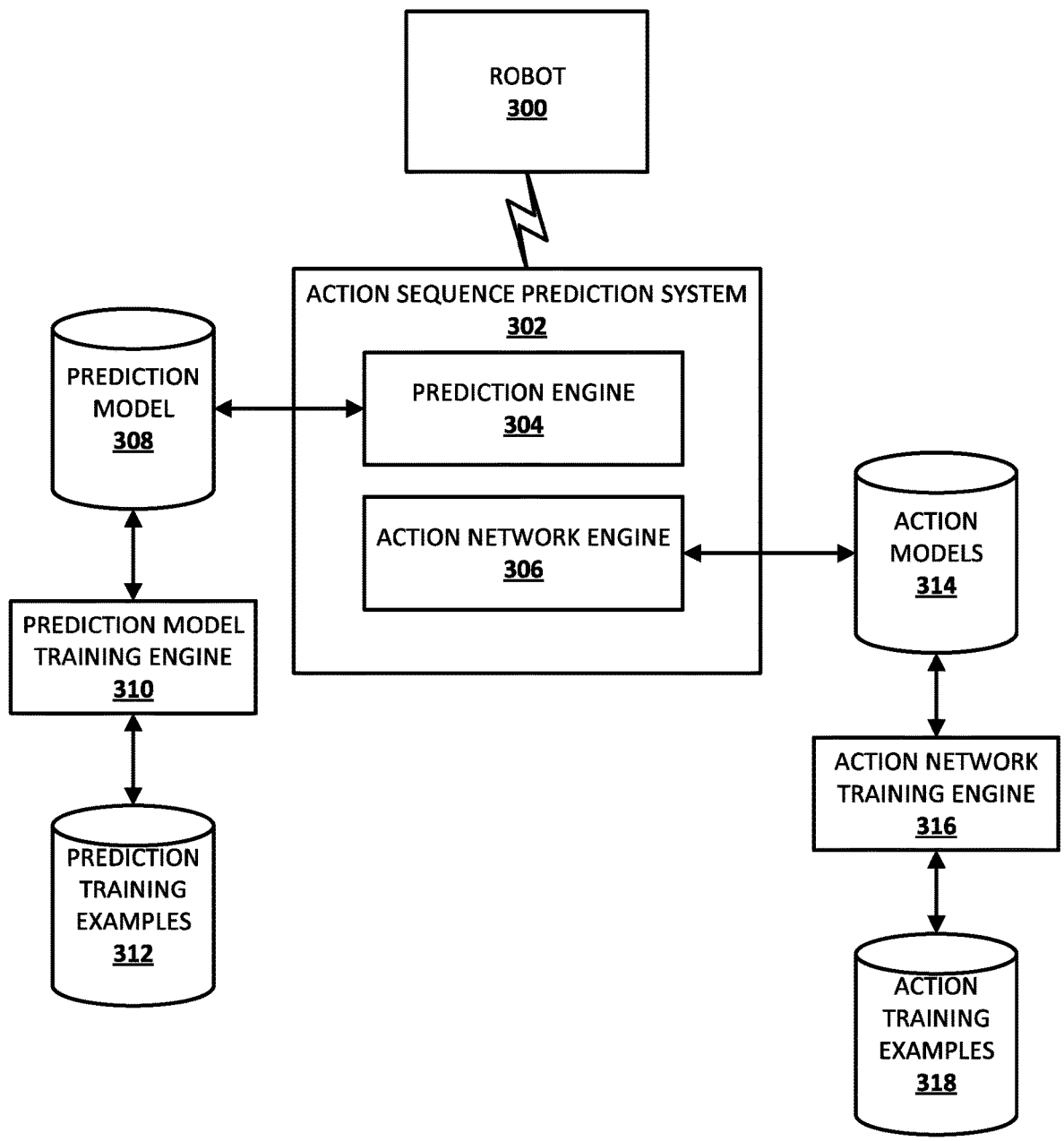
FIG. 3 illustrates an example environment in which various implementations can be implemented in accordance with implementations disclosed herein.

FIG. 3 illustrates an example environment in which implementations described herein may be implemented. FIG. 3 includes an example robot 300, an action sequence prediction system 302, a prediction engine 304, an action network engine 306, a prediction model training engine 310, an action network training engine 316, and/or additional or alternative engine(s) (not depicted). Also included is prediction model 308, prediction training examples 312, action models 314, and action training examples 318.

Robot 300 is a "robot arm" having multiple degrees of freedom to enable traversal of grasping end effectors along any of a plurality of potential paths to position the grasping end effector in desired locations. Robot 300 further controls two opposed "claws" of the grasping end effector to actuate the claws between at least an open position and a closed position (and/or optionally a plurality of "partially closed" positions). Furthermore, robot 300 can include a variety of sensors that can generate images related to shape, color, depth, and/or other features of object(s) that are in the line of sight of the sensors. The vision sensors may be, for example, monographic cameras, stereographic cameras, and/or 3D laser scanners. A 3D laser scanner may be, for example, a time-of-flight 3D laser scanner or a triangulation based 3D laser scanner and may include a position sensitive detector (PDS) or other optical position sensor. Robot 300 can include additional and/or alternative sensors.

Although a particular robot 300 is described with respect to FIG. 3, additional and/or alternative robots may be utilized, including additional robot arms that are similar to robot 300, robots having other robot arm forms, robots having a humanoid form, robots having an animal form, robots that move via one or more wheels (e.g., self-balancing robots), submersible vehicle robots, an unmanned aerial vehicle ("UAV"), and so forth. Additional and/or alternative end effects may be utilized, such as alternative impactive grasping end effectors (e.g., those with grasping "plates", those with more or fewer "digits"/"claws"), ingressive grasping end effectors, astrictive grasping end effectors, contigutive grasping end effectors, or non-grasping end effectors.

Action sequence prediction system 302 can be utilized by robot 300 to generate a set of predicted actions and a corresponding particular order. In many implementations, action sequence prediction system 302 can include prediction engine 304 as well as action network engine 306. In many implementations, prediction engine 304 can process an instance of sensor data such as an instance of vision data using environment-conditioned action sequence prediction model 308 to generate a set of predicted actions as well as a corresponding particular order to perform the predicted actions. Prediction model training engine 310 can train prediction model 308 using prediction training examples 312. Training an environment-conditioned action sequence prediction model such as prediction model 308 in accordance with a variety of implementations is described with respect to process 500 of FIG. 5 and/or process 600 of FIG. 6.

Action network engine 306 can process the set of predicted actions determined using prediction engine 304 to determine one or more corresponding action models of actions models 314. In many implementations, each predicted action has a distinct corresponding action model. Additionally or alternatively, action network engine 306 can process additional instance(s) of sensor data to perform each action in the set of predicted actions by processing the additional instance(s) of sensor data using the corresponding action model until the action is complete and the set of actions are complete. Action network training engine 316 can train action models 314 based on action training examples. In a variety of implementations, action training examples 318 can include a kinesthetic demonstration of an operator performing each action using the robot. In a variety of implementations, each action model can be a policy network which is trained by action network training engine 316 using reinforcement learning. Training one or more action networks such as action models 314 in accordance with many implementations is described herein with respect to process 700 of FIG. 7.

Figure 4:
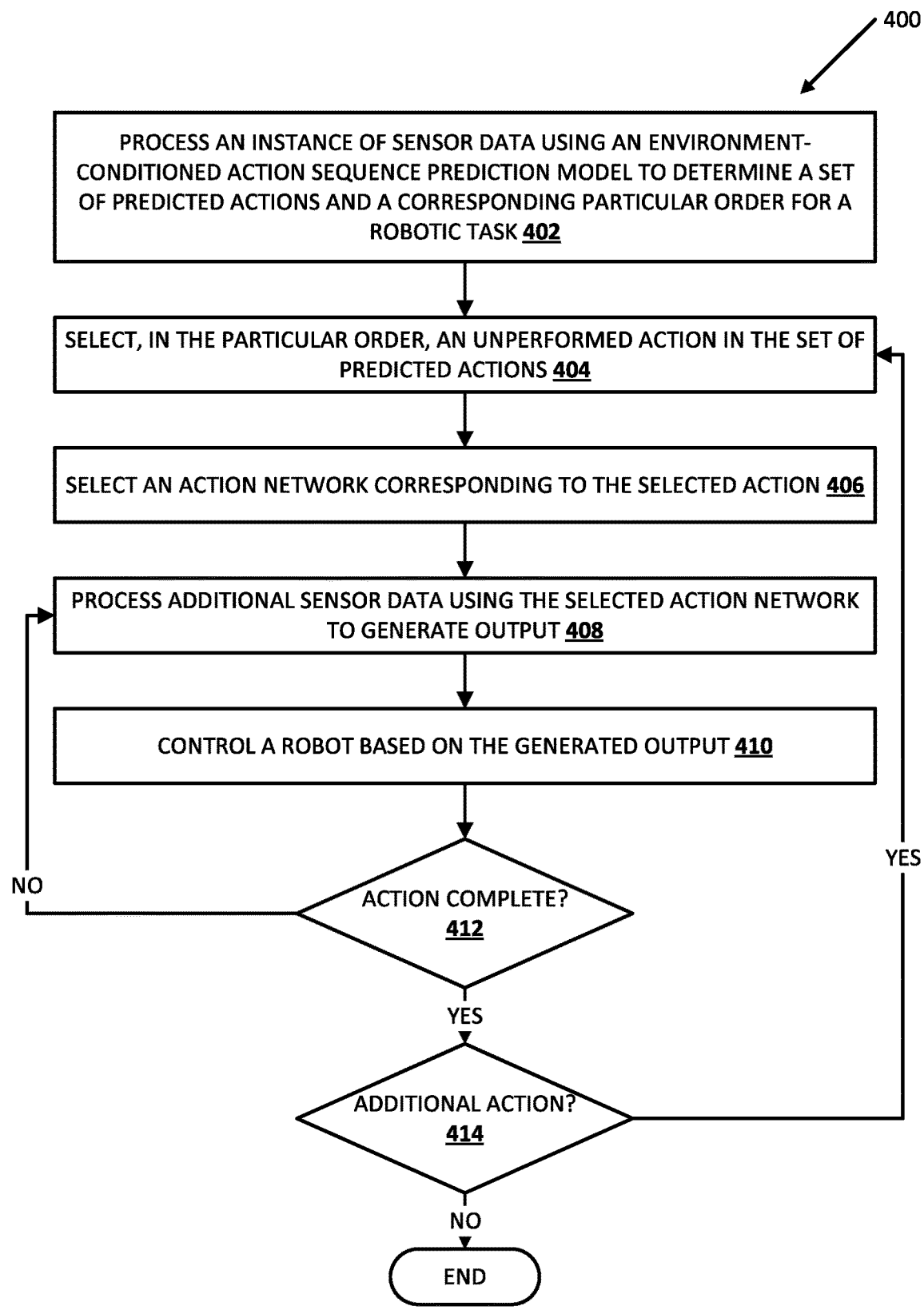
FIG. 4 is a flowchart illustrating an example process of controlling a robot based on a set of predicted actions in accordance with implementations disclosed herein.

FIG. 4 is a flowchart illustrating an example process 400 of controlling a robot based on a set of predicted actions according to implementations disclosed herein. For convenience, the operations of process 400 are described with reference to a system that performs the operations. This system may include various components of various computer systems, such as one or more components depicted in FIG. 8 and/or FIG. 9. Moreover, while operations of process 400 are shown in a particular order, this is not meant to be limiting. One or more operations by be reordered, omitted, and/or added.

At block 402, the system processes an instance of sensor data (e.g., sensor data 102 of FIG. 1) using an environment-conditioned action sequence prediction model to determine a set of predicted actions and a corresponding particular order to perform the actions for a robotic task. The instance of sensor data can include an instance of vision data captured using one or more vision sensors of the robot. For example, the instance of vision data can include an image captured using a camera of the robot. However, this is merely illustrative and additional and/or alternative instances of sensor data may be utilized in accordance with some implementations described herein.

In many implementations, the environment-conditioned action sequence prediction model can include a convolutional neural network portion, a sequence-to-sequence network portion, and/or additional or alternative portion(s). In some such implementations, the instance of vision data can be processed using the convolutional neural network model portion to determine an embedding corresponding to the instance of vision data. The embedding can be processed using the sequence-to-sequence model portion (e.g., an encoder-decoder model portion) to determine the set of predicted actions and the corresponding order to perform the predicted actions for the robotic task. Environment-conditioned action sequence prediction model(s) in accordance with many implementations can be utilized with a variety of robotic tasks including object manipulation tasks, navigation tasks, and/or additional robotic tasks. Process 400 of FIG. 4 is described with respect to convolutional neural network portion and a sequence-to-sequence network portion. However, this is merely illustrative and additional and/or alternative network(s) may be utilized. For example, any of a variety of networks may be utilized including recurrent neural network portion(s), transformer model portion(s), and/or additional or alternative neural network portion(s).

In many implementations, the set of predicted actions is conditioned on the environment of the robot (e.g., conditioned on the instance of sensor data). For example, in the object manipulation object described with respect to FIGS. 2A-2C, the environment-conditioned action sequence prediction model can be used in determining different sets of predicted actions based on different initial instances of sensor data.

At block 404, the system selects, in the particular order, an unperformed action in the set of predicted actions.

At block 406, the system selects an action network corresponding to the selected action. In many implementations, a distinct action prediction network corresponds with each predicted action. For example, the action prediction networks can each be policy networks trained using dynamical system policies. In some implementations, the action network corresponding to the selected action can be selected using action network engine 306 from action models 314 as described in FIG. 3.

At block 408, the system processes an additional instance of sensor data using the selected action network to generate output. For example, the additional instance of sensor data can include a current pose of each object with respect to the robot.

At block 410, the system controls a robot based on the generated output. For example, when the robot is performing a navigation task the generated output can indicate a trajectory for the robot. As another example, the generated output can indicate motor command(s) to move an end effector to grasp an object.

At block 412, the system determines whether the robot has finished performing the selected action. If no, the system proceeds back to block 408 to process an additional instance of sensor data using the selected action network to generate additional output and proceeds to block 410 to control the robot based on the additional generated output. If the robot has finished performing the selected action, the system proceeds to block 414.

At block 414, the system determines whether there are any unperformed actions in the set of predicted actions. If yes, the system proceeds to block 404 and selects, in the particular order, the next unperformed action in the set of predicted actions before proceeding to blocks 406, 408, and 410 using the next unperformed action. If no, the process ends.

Figure 5:
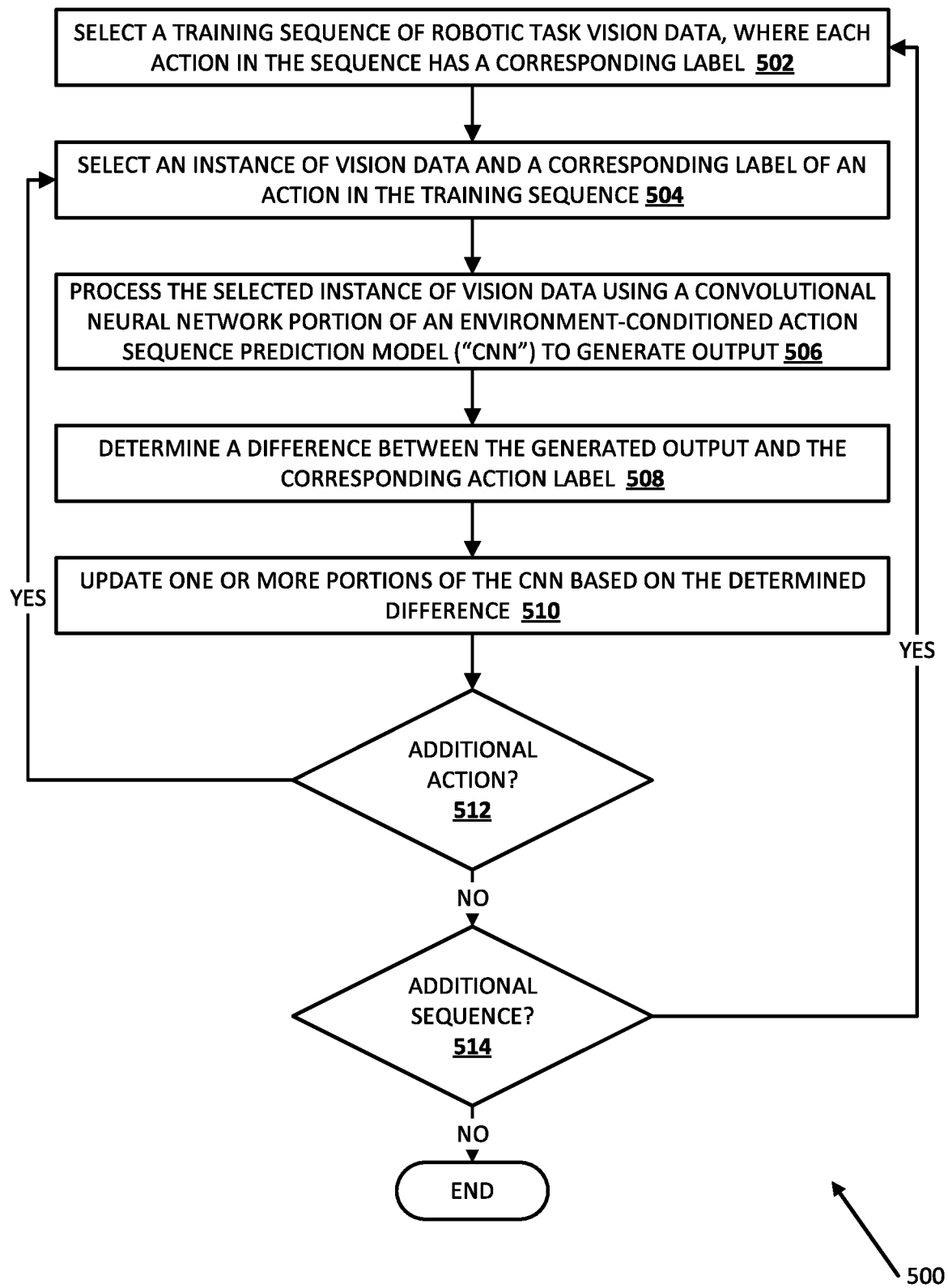
FIG. 5 is a flowchart illustrating an example process of training a convolutional neural network model portion of an environment-conditioned action sequence prediction model in accordance with implementations disclosed herein.

FIG. 5 is a flowchart illustrating an example process 500 of training a convolutional neural network model portion of an environment-conditioned action sequence prediction model according to implementations disclosed herein. For convenience, the operations of process 500 are described with reference to a system that performs the operations. This system may include various components of various computer systems, such as one or more components depicted in FIG. 8 and/or FIG. 9. Moreover, while operations of process 500 are shown in a particular order, this is not meant to be limiting. One or more operations by be reordered, omitted, and/or added.

At block 502, the system selects a training sequence of robotic task vision data where each action in the training sequence has a corresponding label. For example, a training sequence can capture a robot performing the object manipulation task described above with respect to FIG. 2B where corresponding actions in the training sequence have labels of: move block 202, move block 204, move block 206. In many implementations, the training sequence of robotic task vision data can be selected from prediction training examples 312 of FIG. 3.

At block 504, the system selects an instance of vision data and a corresponding label of an action in the training sequence selected at block 502. For example, the system can select an instance of vision data in the training sequence capturing the robot moving block 202, and can select a corresponding action label of "moving block 202".

At block 506, the system processes the selected instance of vision data using a convolutional neural network model portion of an environment-conditioned action sequence prediction model to generate predicted output. For example, the system can process the selected instance of vision data using CNN 106 of action sequence prediction model 104 as illustrated in FIG. 1.

At block 508, the system determines a difference between the predicted output and the corresponding action label.

At block 510, the system updates one or more portions of the convolutional neural network model portion based on the difference determined at block 508. For example, the system can update one or more weights of the convolutional neural network model using backpropagation.

At block 512, the system determines whether to process any additional actions in the training sequence. If yes, the system proceeds back to block 504 and selects an additional instance of vision data and an additional corresponding action label before proceeding to blocks 506, 508, and 510 using the additional instance of vision data and the additional corresponding action label. If no, the system proceeds to block 514.

At block 514, the system determines whether to process any additional training sequences of the robotic task. If yes, the system proceeds back to block 502 and selects an additional training sequence of robotic vision data before proceeding to blocks 504, 506, 508, 510, and 512 using the additional training sequence. If not, the system ends.

Figure 6:
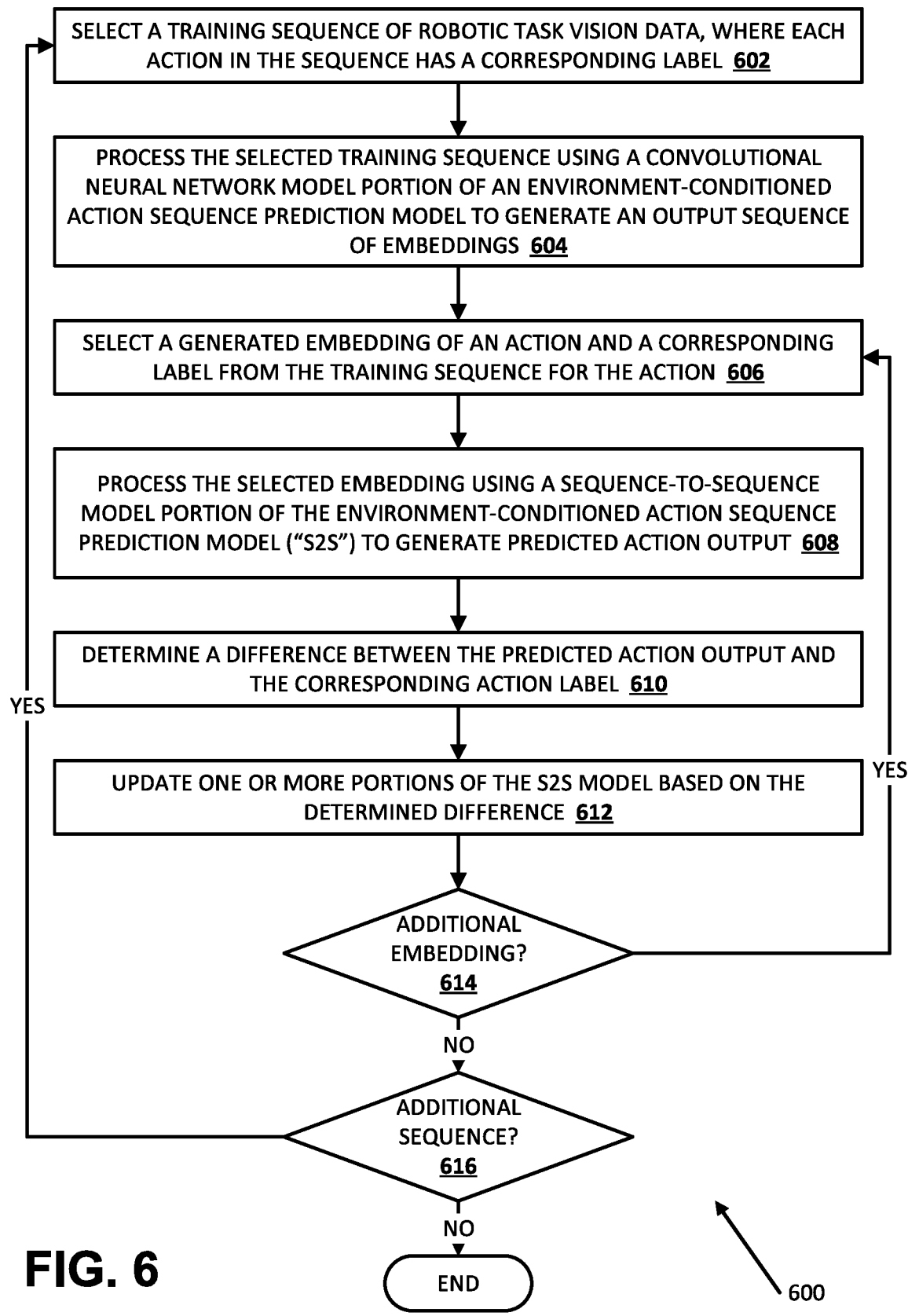
FIG. 6 is a flowchart illustrating an example process of training a sequence-to-sequence model portion of an environment-conditioned action sequence prediction model in accordance with implementations disclosed herein.

FIG. 6 is a flowchart illustrating an example process 600 of training a sequence-to-sequence model portion of an environment-conditioned action sequence prediction model according to implementations disclosed herein. For convenience, the operations of process 600 are described with reference to a system that performs the operations. This system may include various components of various computer systems, such as one or more components depicted in FIG. 8 and/or FIG. 9. Moreover, while operations of process 600 are shown in a particular order, this is not meant to be limiting. One or more operations by be reordered, omitted, and/or added.

At block 602, the system selects a training sequence of robotic task vision data, where each action in the sequence has a corresponding label. In many implementations, the training sequence can be selected from prediction training examples 312 of FIG. 3.

At block 604, the system processes the selected training sequence using a convolutional neural network model portion of the environment-conditioned action sequence prediction model to generate an output sequence of embeddings. In some implementations, the convolutional neural network model portion of the environment-conditioned action sequence prediction model is trained in accordance with process 500 of FIG. 5.

At block 606, the system selects a generated embedding of an action and a corresponding label from the training sequence for the action.

At block 608, the system processes the selected embedding using a sequence-to-sequence model portion of the environment-conditioned action sequence prediction model to generate prediction action output.

At block 610, the system determines a difference between the predicted action output and the corresponding action label.

At block 612, the system updates one or more portions of the sequence-to-sequence model based on the difference determined at block 610 (e.g., update through backpropagation).

At block 614, the system determines whether to process any additional embeddings of the action generated using the convolutional neural network. If yes, the system proceeds back to block 606 and selects an additional embedding of the action before proceeding to blocks 608, 610, and 612 using the additional action. If no, the system proceeds to block 616.

At block 616, the system determines whether to select any additional training sequences of robotic task vision data. If yes, the system proceeds back to block 602 and selects an additional training sequence before proceeding to blocks 604, 606, 608, 610, 612, and 614 using the additional training sequence. If not, the system ends.

Figure 7:
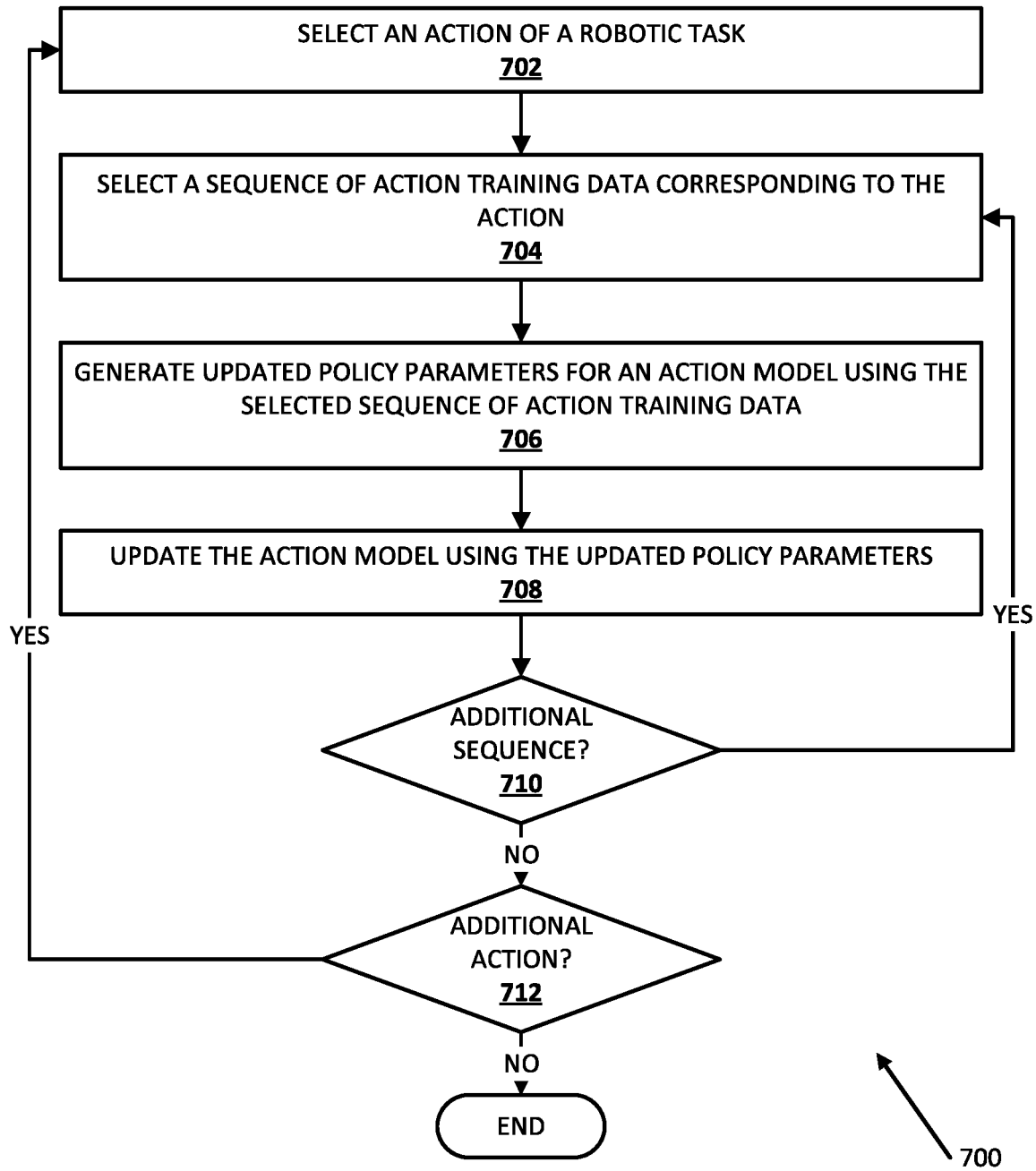
FIG. 7 is a flowchart illustrating an example process of training action networks in accordance with implementations disclosed herein.

FIG. 7 is a flowchart illustrating an example process 700 of training one or more action networks according to implementations disclosed herein. For convenience, the operations of process 700 are described with reference to a system that performs the operations. This system may include various components of various computer systems, such as one or more components depicted in FIG. 8 and/or FIG. 9. Moreover, while operations of process 700 are shown in a particular order, this is not meant to be limiting. One or more operations by be reordered, omitted, and/or added.

At block 702, the system selects an action of a robotic task.

At block 704, the system selects a sequence of action training data corresponding to the action. In many implementations, the action training data is selected from action training examples 318 depicted in FIG. 3.

At block 706, the system generates updated policy parameters for an action model corresponding to the action using the selected sequence of action training data.

At block 708, the system updates the action model using the updated policy parameters.

At block 710, the system determines whether to process an additional training sequence for the robotic action. If yes, the system proceeds back to block 704 and selects an additional sequence of training data corresponding to the action before proceeding to blocks 706, and 708 using the additional sequence of training data. If no, the system proceeds to block 712.

At block 712, the system determines whether to train an additional action model corresponding to an additional action. If yes, the system proceeds back to block 702 and selects an additional action of the robotic task before proceeding to blocks 704, 706, 708, and 710 using the additional action. If no, the system ends.

Figure 8:
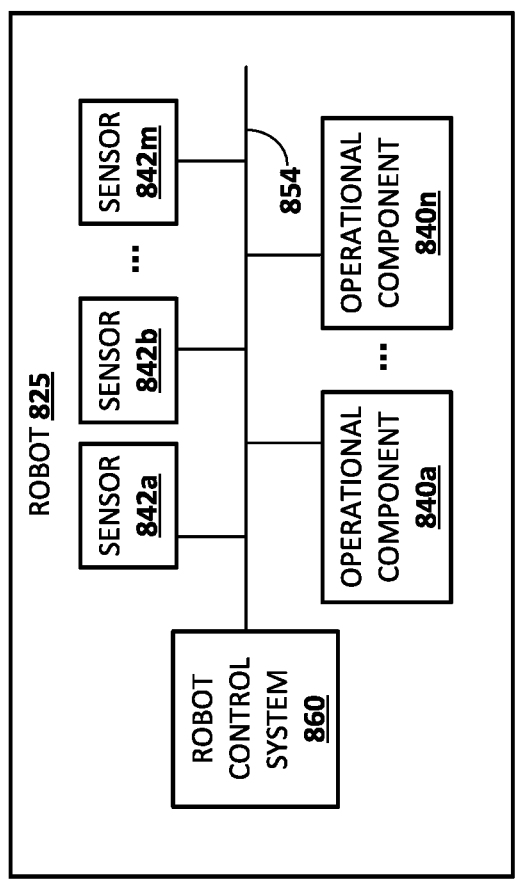
FIG. 8 schematically depicts an example architecture of a robot.

FIG. 8 schematically depicts an example architecture of a robot 825. The robot 825 includes a robot control system 860, one or more operational components 825a-825n, and one or more sensors 842a-842m. The sensors 842a-842m may include, for example, vision sensors, light sensors, pressure sensors, pressure wave sensors (e.g., microphones), proximity sensors, accelerometers, gyroscopes, thermometers, barometers, and so forth. While sensors 842a-m are depicted as being integral with robot 825, this is not meant to be limiting. In some implementations, sensors 842a-m may be located external to robot 825, e.g., as standalone units.

Operational components 840a-840n may include, for example, one or more end effectors and/or one or more servo motors or other actuators to effectuate movement of one or more components of the robot. For example, the robot 825 may have multiple degrees of freedom and each of the actuators may control actuation of the robot 825 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 860 may be implemented in one or more processors, such as a CPU, GPU, and/or other controller(s) of the robot 825. In some implementations, the robot 825 may comprise a "brain box" that may include all or aspects of the control system 860. For example, the brain box may provide real time bursts of data to the operational components 840a-n, with each of the real time bursts comprising a set of one or more control commands that dictate, inter alia, the parameters of motion (if any) for each of one or more of the operational components 840a-n. In some implementations, the robot control system 860 may perform one or more aspects of processes 400, 500, 600, and/or 700 described herein. As described herein, in some implementations all or aspects of the control commands generated by control system 860 can position limb(s) of robot 825 for robotic locomotion tasks. Although control system 860 is illustrated in FIG. 8 as an integral part of robot 825, in some implementations, all or aspects of the control system 860 may be implemented in a component that is separate from, but in communication with robot 825. For example, all or aspects of control system 860 may be implemented on one or more computing devices that are in wired and/or wireless communication with the robot 825, such as computing device 910.

Figure 9:
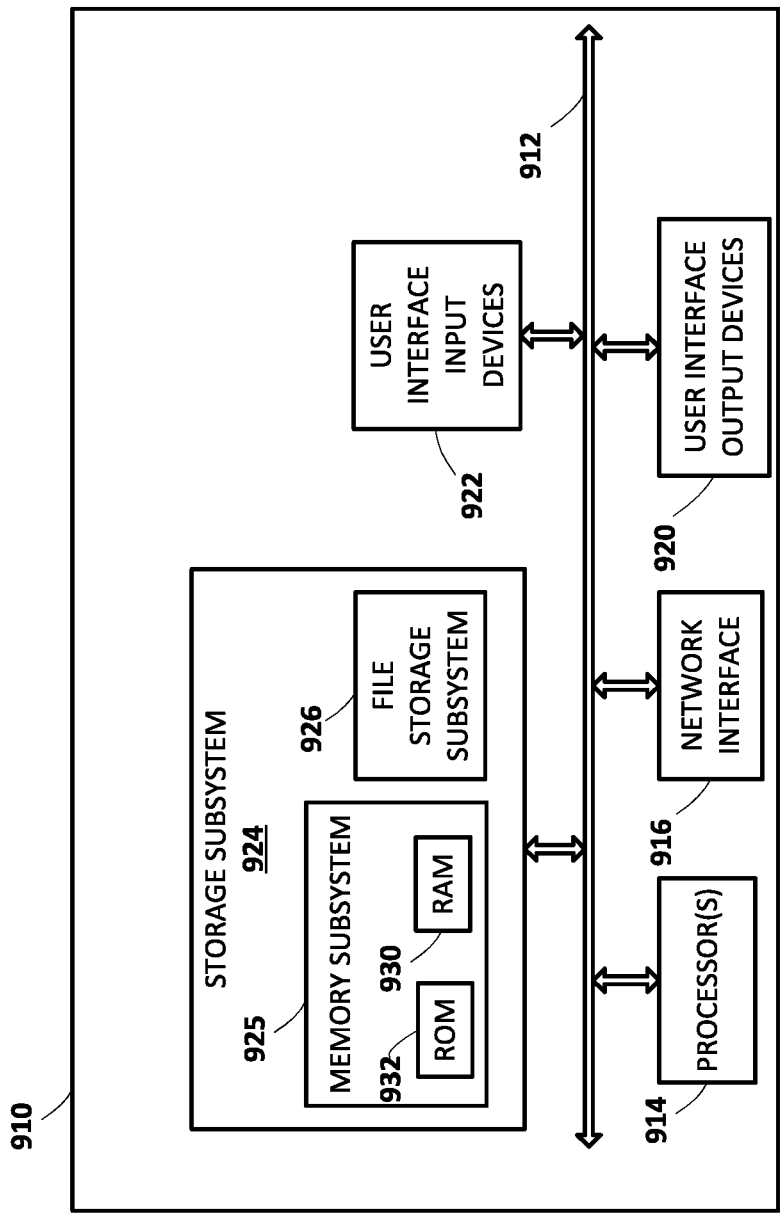
FIG. 9 schematically depicts an example architecture of a computer system.

FIG. 9 is a block diagram of an example computing device 910 that may optionally be utilized to perform one or more aspects of techniques described herein. For example, in some implementations computing device 910 may be utilized to provide desired locomotion by robot 825 and/or other robots. Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the process of FIGS. 4, 5, 6, and/or 7.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors of a robot is provided that includes processing an instance of sensor data using an environment-conditioned action sequence prediction model, wherein the sensor data includes an instance of vision data captured by a vision component of the robot, and wherein the environment-conditioned action sequence prediction model is a trained machine learning model. The method further includes determining, based on output generated based on the processing using the environment-conditioned action sequence prediction model, a set of predicted actions for a robotic task, and a particular order for performing the predicted actions of the set. The method further includes controlling the robot to perform the predicted actions of the set in the particular order, where controlling the robot to perform each of the predicted actions of the set in the particular order includes: for each of the predicted actions, and in the particular order, selecting a corresponding action network that corresponds to the predicted action. Until determining that the predicted action is complete, the method further includes processing corresponding additional sensor data, of the robot, using the corresponding action network. The method further includes controlling the robot based on action output, generated based on the processing using the corresponding action network.

These and other implementations of the technology disclosed herein can include one or more of the following features.

In some implementations, the method further includes processing a second instance of sensor data using the environment-conditioned action sequence prediction model, wherein the second instance of second data includes a second instance of vision data captured by the vision component of the robot. In some versions of those implementations, the method further includes determining, based on second output generated based on the processing using the environmental-conditioned action sequence prediction model, a second set of predicted actions for the robotic task, and a second particular order for performing the predicted actions of the set. In some versions of those implementations, the method further includes controlling the robot to perform the predicted actions of the second set in the particular order, wherein controlling the robot to perform each of the predicted actions of the second set is the particular order includes, for each of the predicted actions in the second set, and in the second particular order, selecting the corresponding action network that corresponds to the predicted action. Until determining the predicted action is complete, in some versions of those implementations, the method further includes processing corresponding additional sensor data, for the robot, using the corresponding action network, and controlling the robot based on additional action output, generated based on the processing using the corresponding action network. In some versions of those implementations, the set of predicted actions for the task includes one or more predicted actions not included in the second set of predicted actions for the task. In some versions of those implementations, the predicted actions in the set of predicted actions are the same predicted actions in the second set of predicted actions, and wherein the particular order for the set of predicted actions is not the particular order for the second set of predicted actions. In some versions of those implementations, processing the instance of sensor data using the environment-conditioned action sequence prediction model includes processing the instance of vision data using a convolutional neural network model portion of the environment-conditioned action sequence prediction model to generate an embedding corresponding to the instance of vision data. In some versions of those implementations, the method further includes processing the embedding using an encoder-decoder model portion of the environment-conditioned action sequence prediction model to generate output.

In some implementations, the task is an object manipulation task.

In some implementations, the task is a robotic navigation task.

In some implementations, each predicted action has a distinct corresponding action network. In some versions of those implementations, the distinct corresponding action network for each predicted action is a policy network. In some versions of those implementations, the distinct corresponding action network for each predicted action is trained using a dynamical systems policy.

In some implementations, processing corresponding additional sensor data, of the robot, using the corresponding action network includes detecting one or more objects in an environment of the robot using a perception system of the robot. In some versions of those implementations the method further includes determining a pose of each detected object using the perception system of the robot. In some versions of those implementations, the method further includes processing the determined pose of each detected object using the corresponding action network.

In some implementations, the environment-conditioned action sequence prediction model is trained by selecting a training instance of sensor data including a training instance of vision data capturing the robot performing an action and a corresponding label of the action. In some versions of those implementations, the method further includes processing the training instance of vision data using the convolutional neural network model portion of the environment-conditioned action sequence prediction model to generate a predicted embedding. In some versions of those implementations, the method further includes determining a difference between the predicted embedding and the label of the action. In some versions of those implementations, the method further includes updating one or more portions of the convolutional neural network model based on the determined difference.

In some implementations, the method further includes processing the predicted embedding generated using the convolutional neural network using the encoder-decoder model portion of the environment-conditioned action sequence prediction model to generate predicted output. In some versions of those implementations, the method further includes determining an additional difference between the predicted output and the corresponding action label. In some versions of those implementations, the method further includes updating one or more portions of the encoder-decoder model based on the determined additional difference.

In some implementations, the policy network for each predicted action is trained by selecting an action training instance including a sequence of vision data capturing the robot performing the predicted action. In some versions of those implementations, the method further includes generating updated policy parameters for the policy network corresponding to the predicted action using the selected action training instance. In some versions of those implementations, the method further includes updating one or more portions of the policy network corresponding to the predicted action using the updated policy parameters.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

We claim:

1. A method implemented by one or more processors of a robot, the method comprising:
processing an instance of sensor data using an environment-conditioned action sequence prediction model, wherein the sensor data includes an instance of vision data captured by a vision component of the robot, wherein the vision data comprises an image of at least one object in the environment of the robot, and wherein the environment-conditioned action sequence prediction model is a trained machine learning model;
determining, based on output generated based on the processing using the environment-conditioned action sequence prediction model, a first set of predicted actions for an object manipulation robotic task associated with the at least one object, and a particular order for performing the predicted actions of the set;
controlling the robot to perform the predicted actions of the first set in the particular order, wherein controlling the robot to perform each of the predicted actions of the first set in the particular order comprises:
for each of the predicted actions, and in the particular order:
selecting a corresponding action network that corresponds to the predicted action;
until determining that the predicted action is complete:
processing corresponding additional instances of sensor data, of the robot, using the corresponding action network, and
controlling the robot based on action output, generated based on the processing using the corresponding action network.

2. The method of claim 1, further comprising:
processing a second instance of sensor data using the environment-conditioned action sequence prediction model, wherein the second instance of sensor data includes a second instance of vision data captured by the vision component of the robot;
determining, based on second output generated based on the processing using the environmental-conditioned action sequence prediction model, a second set of predicted actions for the robotic task, and a second particular order for performing the predicted actions of the set;
controlling the robot to perform the predicted actions of the second set in the particular order, wherein controlling the robot to perform each of the predicted actions of the second set is the particular order comprises:
for each of the predicted actions in the second set, and in the second particular order:
selecting the corresponding action network that corresponds to the predicted action;

until determining the predicted action is complete:
processing corresponding additional instances of sensor data, for the robot, using the corresponding action network, and
controlling the robot based on additional action output, generated based on the processing using the corresponding action network.

3. The method of claim 2, wherein the first set of predicted actions for the task includes one or more predicted actions not included in the second set of predicted actions for the task.

4. The method of claim 2, wherein the predicted actions in the first set of predicted actions are the same predicted actions in the second set of predicted actions, and wherein the particular order for the first set of predicted actions is not the particular order for the second set of predicted actions.

5. The method of claim 2, wherein processing the instance of sensor data using the environment-conditioned action sequence prediction model comprises:
processing the instance of vision data using a convolutional neural network model portion of the environment-conditioned action sequence prediction model to generate an embedding corresponding to the instance of vision data; and
processing the embedding using a encoder-decoder model portion of the environment-conditioned action sequence prediction model to generate output.

6. The method of claim 1, wherein each predicted action has a distinct corresponding action network.

7. The method of claim 6, wherein the distinct corresponding action network for each predicted action is a policy network.

8. The method of claim 7, wherein the distinct corresponding action network for each predicted action is trained a dynamical systems policy.

9. The method of any preceding claim 1, wherein processing corresponding additional sensor data, of the robot, using the corresponding action network comprises:
detecting one or more objects in an environment of the robot using a perception system of the robot;
determining a pose of each detected object using the perception system of the robot; and
processing the determined pose of each detected object using the corresponding action network.

10. The method of claim 5, wherein the environment-conditioned action sequence prediction model is trained by:
selecting a training instance of sensor data including a training instance of vision data capturing the robot performing an action and a corresponding label of the action;
processing the training instance of vision data using the convolutional neural network model portion of the environment-conditioned action sequence prediction model to generate a predicted embedding;
determining a difference between the predicted embedding and the label of the action; and
updating one or more portions of the convolutional neural network model based on the determined difference.

11. The method of claim 10, further comprising:
processing the predicted embedding generated using the convolutional neural network using the encoder-decoder model portion of the environment-conditioned action sequence prediction model to generate predicted output;
determining an additional difference between the predicted output and the corresponding action label; and
updating one or more portions of the encoder-decoder model based on the determined additional difference.

12. The method of claim 7, wherein the policy network for each predicted action is trained by:
selecting an action training instance including a sequence of vision data capturing the robot performing the predicted action;
generating updated policy parameters for the policy network corresponding to the predicted action using the selected action training instance; and
updating one or more portions of the policy network corresponding to the predicted action using the updated policy parameters.

13. A non-transitory computer-readable storage medium comprising instructions, which, when executed by one or more processors, cause the one or more processors to perform operations that include:
processing an instance of sensor data using an environment-conditioned action sequence prediction model, wherein the sensor data includes an instance of vision data captured by a vision component of the robot, wherein the vision data comprises an image of at least one object in the environment of the robot, and wherein the environment-conditioned action sequence prediction model is a trained machine learning model;
determining, based on output generated based on the processing using the environment-conditioned action sequence prediction model, a first set of predicted actions for an object manipulation robotic task associated with the at least one object, and a particular order for performing the predicted actions of the set;
controlling the robot to perform the predicted actions of the first set in the particular order, wherein controlling the robot to perform each of the predicted actions of the first set in the particular order comprises:
for each of the predicted actions, and in the particular order:
selecting a corresponding action network that corresponds to the predicted action;
until determining that the predicted action is complete:
processing corresponding additional instances of sensor data, of the robot, using the corresponding action network, and
controlling the robot based on action output, generated based on the processing using the corresponding action network.

14. A system comprising:
one or more processors; and
memory configured to store instructions that, when executed by the one or more processors cause the one or more processors to perform operations that include:
processing an instance of sensor data using an environment-conditioned action sequence prediction model, wherein the sensor data includes an instance of vision data captured by a vision component of the robot, wherein the vision data comprises an image of at least one object in the environment of the robot, and wherein the environment-conditioned action sequence prediction model is a trained machine learning model;
determining, based on output generated based on the processing using the environment-conditioned action sequence prediction model, a first set of predicted actions for an object manipulation robotic task associated with the at least one object, and a particular order for performing the predicted actions of the set;

controlling the robot to perform the predicted actions of the first set in the particular order, wherein controlling the robot to perform each of the predicted actions of the first set in the particular order comprises:

for each of the predicted actions, and in the particular order:

selecting a corresponding action network that corresponds to the predicted action;

until determining that the predicted action is complete:

processing corresponding additional instances of sensor data, of the robot, using the corresponding action network, and controlling the robot based on action output, generated based on the processing using the corresponding action network.

* * * * *